(12) United States Patent
Naheiri et al.

(10) Patent No.: US 8,496,738 B1
(45) Date of Patent: Jul. 30, 2013

(54) NITROGEN AND OXYGEN SEPARATION USING VACUUM SWING ADSORPTION

(75) Inventors: Tarik Naheiri, Dana Point, CA (US); Steve Schellhase, Irvine, CA (US); Javier Lopez, Corona, CA (US); James Yang, Santa Ana, CA (US)

(73) Assignee: Pacific Consolidated Industries, Inc., Riverside, CA (US)

( * ) Notice: Subject to any disclaimer, the term of this patent is extended or adjusted under 35 U.S.C. 154(b) by 238 days.

(21) Appl. No.: 12/931,314

(22) Filed: Jan. 27, 2011

Related U.S. Application Data

(60) Provisional application No. 61/336,923, filed on Jan. 27, 2010.

(51) Int. Cl.
*B01D 53/02* (2006.01)

(52) U.S. Cl.
USPC .......... 96/128; 96/108; 96/127; 96/148; 95/26; 95/96; 95/97; 95/98; 95/99; 95/102; 95/130; 137/511

(58) Field of Classification Search ........... 96/108, 96/127, 128, 148; 95/26, 96–99, 102, 130; 137/511
See application file for complete search history.

(56) References Cited

U.S. PATENT DOCUMENTS

| | | | | |
|---|---|---|---|---|
| 4,158,639 A * | 6/1979 | Berty | .......... | 588/13 |
| 4,194,890 A * | 3/1980 | McCombs et al. | .......... | 95/23 |
| 4,194,892 A * | 3/1980 | Jones et al. | .......... | 95/95 |
| 4,534,346 A * | 8/1985 | Schlaechter | .......... | 128/205.12 |
| 4,561,865 A * | 12/1985 | McCombs et al. | .......... | 95/96 |
| 5,047,073 A * | 9/1991 | Stetter et al. | .......... | 95/8 |
| 5,679,134 A * | 10/1997 | Brugerolle et al. | .......... | 95/96 |
| 5,928,610 A * | 7/1999 | Moran et al. | .......... | 422/120 |
| 6,010,556 A * | 1/2000 | Petit | .......... | 95/98 |
| 6,096,115 A * | 8/2000 | Kleinberg et al. | .......... | 95/101 |
| 6,146,447 A * | 11/2000 | Sircar et al. | .......... | 95/101 |
| 6,156,101 A * | 12/2000 | Naheiri | .......... | 95/101 |
| 6,656,738 B1 * | 12/2003 | Vogel et al. | .......... | 436/161 |
| 6,692,554 B1 * | 2/2004 | Leffel et al. | .......... | 96/108 |
| 7,114,932 B1 * | 10/2006 | Bassine | .......... | 418/268 |
| 7,122,073 B1 * | 10/2006 | Notaro et al. | .......... | 96/143 |
| 7,285,154 B2 * | 10/2007 | Karwacki et al. | .......... | 95/96 |
| 7,297,187 B2 * | 11/2007 | Lee et al. | .......... | 96/121 |
| 7,682,428 B2 * | 3/2010 | Nawata et al. | .......... | 96/113 |
| 7,766,996 B2 * | 8/2010 | Celik et al. | .......... | 95/96 |
| 8,016,916 B2 * | 9/2011 | Ono et al. | .......... | 95/88 |
| 2002/0017191 A1 * | 2/2002 | Maheshwary et al. | .......... | 95/96 |
| 2006/0191412 A1 * | 8/2006 | Sellers et al. | .......... | 95/279 |
| 2008/0241052 A1 * | 10/2008 | Hooper et al. | .......... | 423/581 |
| 2010/0095841 A1 * | 4/2010 | Naheiri | .......... | 95/26 |
| 2011/0315009 A1 * | 12/2011 | Ambriano et al. | .......... | 95/26 |

* cited by examiner

*Primary Examiner* — Christopher P Jones
(74) *Attorney, Agent, or Firm* — Heisler & Associates

(57) ABSTRACT

A mixed gas is separated with collection of at least one constituent gas. An inlet leads to a blower or other gas compression element through a valve. This blower feeds a chamber which contains media which selectively adsorbs the constituent gas to be collected, such as nitrogen from air. An exhaust from the chamber leads to an exhaust through a check valve. The blower can be reversed after nitrogen has been adsorbed within the chamber to desorb nitrogen and deliver nitrogen back through the blower. The inlet valve is closed after blower reversing and a separate diversion pathway is opened so that nitrogen is delivered from the blower to a nitrogen collection region. A variant system also includes an oxygen collection region on a side of the chamber opposite the blower for collection of both nitrogen and oxygen separated from air simultaneously, or collection of other constituent gases.

15 Claims, 3 Drawing Sheets

NITROGEN AND OXYGEN SEPARATION USING VACUUM SWING ADSORPTION

CROSS-REFERENCE TO RELATED APPLICATIONS

This application claims benefit under Title 35, United States Code §119(e) of U.S. Provisional Application No. 61/336,923 filed on Jan. 27, 2010.

FIELD OF THE INVENTION

The following invention relates to pressure swing and vacuum swing adsorption systems for separation of mixed gases such as air from each other. More particularly, this invention relates to vacuum swing adsorption systems and pressure swing adsorption systems which use an adsorption media which preferentially adsorbs nitrogen and with the system configured to collect nitrogen as well as optionally also collecting oxygen.

BACKGROUND OF THE INVENTION

When gases are combined they nearly always exhibit substantially homogeneous distribution within a confined space. Even unconfined spaces such as the atmosphere contain a substantially homogeneous mixture of gases. It is often desirable to have gases collected in pure or substantially pure form. One way to collect such gases is to separate them from a homogeneous mixture of gases where one desired gas is mixed with other gases. For instance, it is often desirable to have oxygen concentrated into a substantially pure form by separation of the oxygen from air.

Air in the atmosphere is a substantially homogeneous mixture of approximately 79% nitrogen, 20% oxygen and 1% argon. Air also includes water vapor to varying degrees depending on the humidity of the air. Air also includes a fraction of a percent of carbon dioxide and trace amounts of other gases such as hydrogen, helium, other noble gases and small trace amounts of gaseous compounds.

One known technique for separating oxygen from air (or separating other desirable gases from a gas mixture) is to take advantage of the different condensation points for different gases at which the gases condense into a liquid. Such "liquefaction" is particularly effective when the gases in the gas mixture have widely different condensation points, and particularly when at least one of the condensation points is near ambient temperature. For instance, a condenser for condensing water vapor out of air is effectively operated, often with little or no power input, to remove large portions of gaseous water (i.e. steam or water vapor) from air.

However, when gases to be separated have similar condensation temperatures or the condensation temperatures are significantly lower than ambient conditions, significant power and potentially elaborate machinery is required for effective gas separation. When oxygen is to be separated from air, such difficulties are encountered. Oxygen and nitrogen have quite similar condensation temperatures and these condensation temperatures are significantly lower than ambient conditions (i.e. −320° F. for nitrogen and −297° F. for oxygen) Thus, liquefaction for effective separation of oxygen from air requires significant power input and elaborate machinery, making such liquefaction undesirable in many instances.

Another widely used technique for air separation (especially when the desired product is nitrogen) is membrane technology. Membrane technology can also be used to concentrate oxygen, but is generally only used when the desired product is nitrogen because it is difficult to get the purity range generally required for oxygen, using membrane technology. In most cases where membrane technology is used, the argon component of the air will stay with the nitrogen while the carbon dioxide and the water will stay with the oxygen.

Another technique for separating gases from a gas mixture is to utilize the unique properties or certain materials which preferentially adsorb one gas over another. For instance, it is known to utilize molecular sieve as an adsorbent which preferentially adsorbs nitrogen over oxygen. When air is passed through a bed of such an adsorbent material, the nitrogen is adsorbed onto the surface of the adsorbent material. Remaining portions of the air are substantially entirely oxygen. Allowing pressure in the bed to swing provides for periods of desorption to repeat the process. Such adsorbent material also adsorbs carbon dioxide and water vapor. While argon is not typically adsorbed and so remains with the oxygen, oxygen can often be effectively utilized even when the argon from the original air gas mixture is still present.

Such pressure swing adsorption systems can be divided into two general types including pressure swing adsorption (PSA) and vacuum swing adsorption (VSA). The primary difference between PSA and VSA is the pressure at which the adsorber material is caused to desorb the gaseous molecules or compounds which had previously adsorbed, to refresh the adsorber material. With PSA, adsorption occurs at a pressure above atmospheric pressure and desorption occurs at a lower pressure, typically at or near atmospheric pressure. With VSA, adsorption occurs at or above atmospheric pressure and desorption occurs below atmospheric pressure in at least a partial vacuum.

Prior art VSA systems known in commercial use are typified by systems such as that provided by Praxair, Air Products Company, Pacific Consolidated Industries and others. An exemplary system is described in U.S. Pat. No. 4,194,890 to McCombs. In such systems, typically one or more adsorption beds are provided. Often two beds are used. In a two bed system one bed adsorbs the nitrogen and other undesirable gasses the other will be in the desorb (refresh) process The simplest example of current art is the case of a single bed VSA system. In these single bed systems the blower rotates in one direction. Air is fed to the bed from the pressure side of the blower. When the bed is saturated with nitrogen, valves are then actuated to change the inlet of the bed from the outlet side of the blower to the inlet side of the blower. Thus the same blower charges the bed with process air and creates the vacuum to desorb the bed.

In pressure swing systems, (PSA and VSA), a buffer tank is usually included so that a constant supply of oxygen can be provided. In most cases, a heat exchanger (or other method of cooling the gasses) is used between the blower and the adsorption bed to remove some of the heat generated in the blower. Almost always, the PSA or the VSA process is used to deliver oxygen. This invention describes the adaptation of the pressure swing process to produce nitrogen.

SUMMARY OF THE INVENTION

With this invention, a vacuum swing adsorption system (or optionally modifiable to operate as a pressure swing adsorption system) is provided for collection of nitrogen and optionally also oxygen from air (or collection of at least one other constituent gas from a gas mixture). The basic system includes an inlet for input of air from a surrounding environment or other source. This inlet is coupled to a gas compression element, preferably in the form of a reversing blower. A chamber is provided on a side of the blower opposite the inlet. An exhaust is provided on a side of the chamber opposite the blower. An exhaust valve is preferably provided between the chamber and the exhaust. A nitrogen collection region is provided on a side of the blower opposite the chamber and a junction is supplied which is selectively openable along with closing of the inlet so that when the blower reverses, nitrogen which has been adsorbed within the chamber is drawn into the nitrogen collection region.

The chamber is configured to contain molecular sieve material, typically in the form of beads of media which selectively adsorbs nitrogen preferentially over oxygen. Thus, when the blower is driving air from the inlet to the chamber, the nitrogen is adsorbed within the chamber and non-nitrogen constituents tend to be preferentially exhausted out of the exhaust through the exhaust valve. After a period of time coinciding with the media within the chamber being saturated with nitrogen, the blower is reversed. The exhaust valve is closed so that a vacuum is drawn on the chamber.

As the pressure drops the media within the chamber releases the nitrogen. This nitrogen then flows through the blower in a reversed direction generally towards the inlet. The inlet valve is configured and controlled to preferably be initially open after the blower reverses so that air between the chamber and the inlet can be pushed back out of the inlet. After this purge has occurred, the inlet valve is closed and the junction facilitates diversion to the nitrogen collection region.

This junction and associated diversion function can be provided by configuring the inlet valve as a three-way valve which simultaneously opens the pathway to the nitrogen collection region when the inlet is closed, or two separate valves can be provided which are caused to open and close opposite each other. Optimally the exhaust valve is opened briefly to purge the chamber of nitrogen before the blower is re-reversed to repeat the cycle performed by the system the second, time. A control is provided to control the valves and the direction of operation of the blower to perform the nitrogen collection function.

In a more complex version of the invention, oxygen or some other second constituent gas can also be collected. In particular, the system described above is further modified to include an oxygen collection region on a side of the chamber opposite the blower. Preferably, an oxygen outlet is provided separate from the exhaust and a three-way valve is interposed downstream of a check valve on a side of the chamber opposite the blower. This three-way valve can selectively allow a gas of primarily oxygen to be discharged from the chamber and away from the blower either to the exhaust or to the oxygen collection region.

In a typical operating mode, this three-way valve would initially be oriented to exhaust gases within the system. After the system has been operating sufficiently to have purged any lingering gases within the system and so that a gas of substantially pure oxygen (typically also with some argon therein) is exiting the chamber, the three-way valve can be adjusted to divert the gas leaving the chamber to go to the oxygen tank or other collection region. Oxygen is thus collected within the oxygen tank while nitrogen is being simultaneously adsorbed within the chamber.

The blower is then reversed and a check valve is caused to close, trapping oxygen within the oxygen tank. A vacuum is drawn on the chamber and nitrogen is desorbed and delivered to the nitrogen collection region back through the blower, as described in detail above. Before re-reversing the blower, a separate purge line and purge valve can be opened to allow oxygen to travel from the oxygen supply to the chamber. The blower can then be re-reversed to complete the cycle again. In such a system, with essentially the same power usage as with the nitrogen system first described above, both nitrogen and oxygen can be simultaneously collected.

While this basic summary of the invention is provided in the context of a system which separates air into nitrogen and oxygen, other mixtures of separate gases could be similarly separated by selecting different adsorption media and adjusting cycle times. Other parameters of the system can include heat exchangers to remove heat of compression associated with operation of the blower, and to also act as condensers to remove water vapor. Condensers and other filters can also be provided adjacent the inlet so that air that is drier than ambient air can be entered into the system and air which is otherwise less contaminated with undesirable constituents is entered into the system. Silencers can also be provided adjacent various inlets and outlets from the system to decrease noise associated with operation of the system.

OBJECTS OF THE INVENTION

Accordingly, a primary object of the present invention is to provide a system for separating nitrogen and oxygen from air.

Another object of the present invention is to separate gases from a gas mixture to produce at least one substantially pure constituent gas.

Another object of the present invention is to provide a relatively low cost system and method for separation of air to supply nitrogen and optionally also oxygen.

Another object of the present invention is to provide a gas separation system which can produce at least two separate collected constituent gases with an amount of power required similar to an amount of power associated with collecting only one gas, such that less power is utilized for an amount of constituent gas collected.

Another object of the present invention is to provide a gas separation system which has a minimum of moving parts to provide a durable and reliable gas separation system.

Other further objects of the present invention will become apparent from a careful reading of the included drawing figures, the claims and detailed description of the invention.

DESCRIPTION OF THE PREFERRED EMBODIMENT

Figure 1:
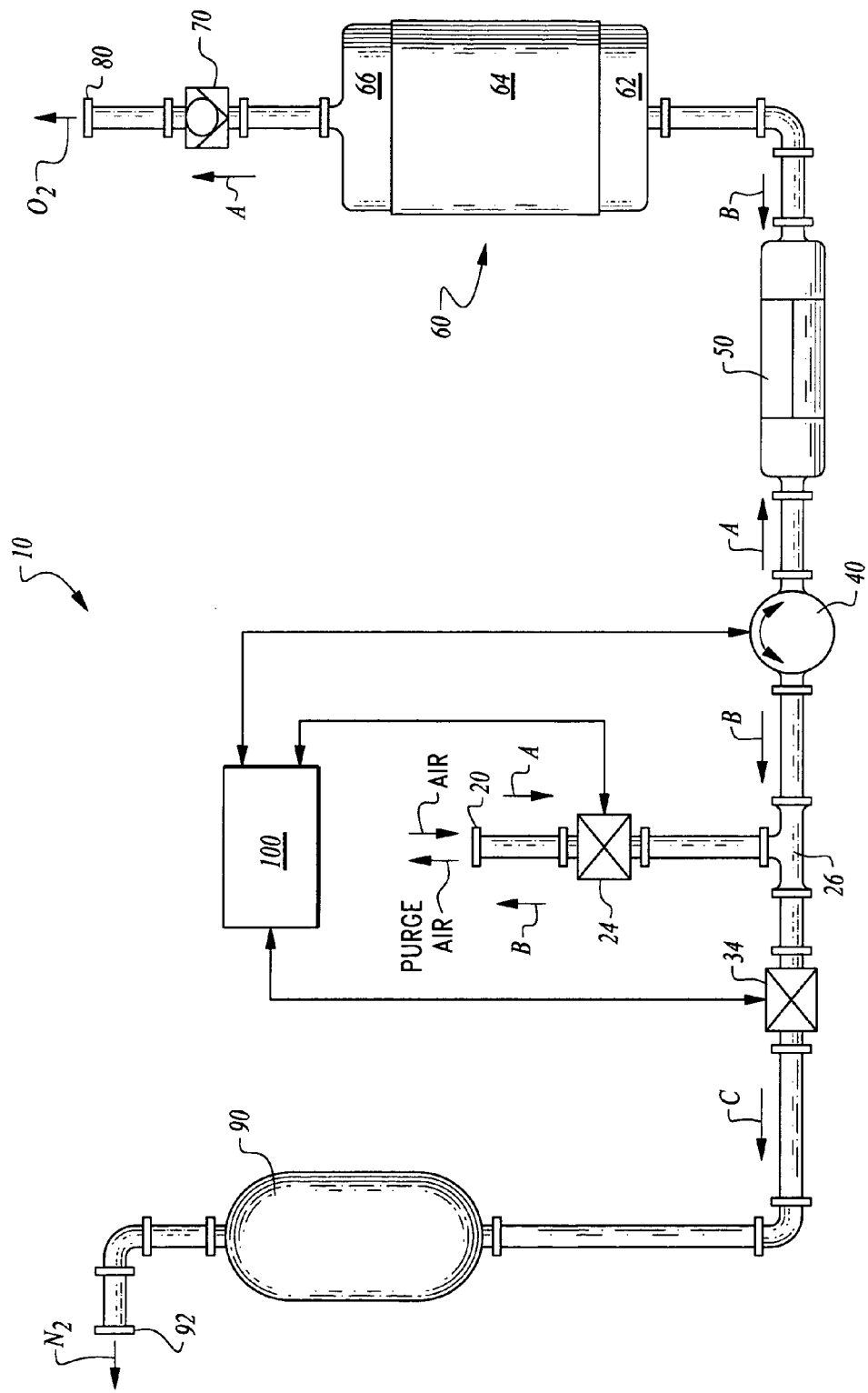
FIG. 1 is a schematic of a first embodiment of this invention which collects a single constituent gas such as nitrogen from a gas mixture such as air.

Referring to the drawings, wherein like reference numerals represent like parts throughout the various drawing figures, reference numeral 10 (FIG. 1) is directed to a nitrogen separation system embodiment of the gas mixture separator of this invention. In this first exemplary embodiment, the system inputs air into an inlet 20 and stores nitrogen within a buffer tank 90 as one form of nitrogen collection region, that can then be discharged as desired for beneficial use.

In essence, and with particular reference to FIG. 1, basic details of this invention are illustrated in the context of this first embodiment. The system 10 includes the inlet 20 for air to enter the system 10. The inlet 20 is coupled to a blower or other gas compression element. At least one valve is interposed between the inlet 20 and the blower 40. In this embodiment an inlet valve 24 and feed valve 34 are located on an inlet 20 side of the blower 40. A heat exchanger 50 is optionally provided on a side of the blower 40 opposite the inlet 20.

A chamber 60 is also provided on a side of the blower 40 opposite the inlet 20. This chamber 60 is configured to support media which selectively adsorbs nitrogen. A check valve 70 or other valve is provided on a side of the chamber 60 opposite the blower 40 and adjacent an exhaust 80. A buffer tank 90 is provided downstream of the feed valve 34 for collection of nitrogen therein, typically as part of a nitrogen supply system.

Figure 2:
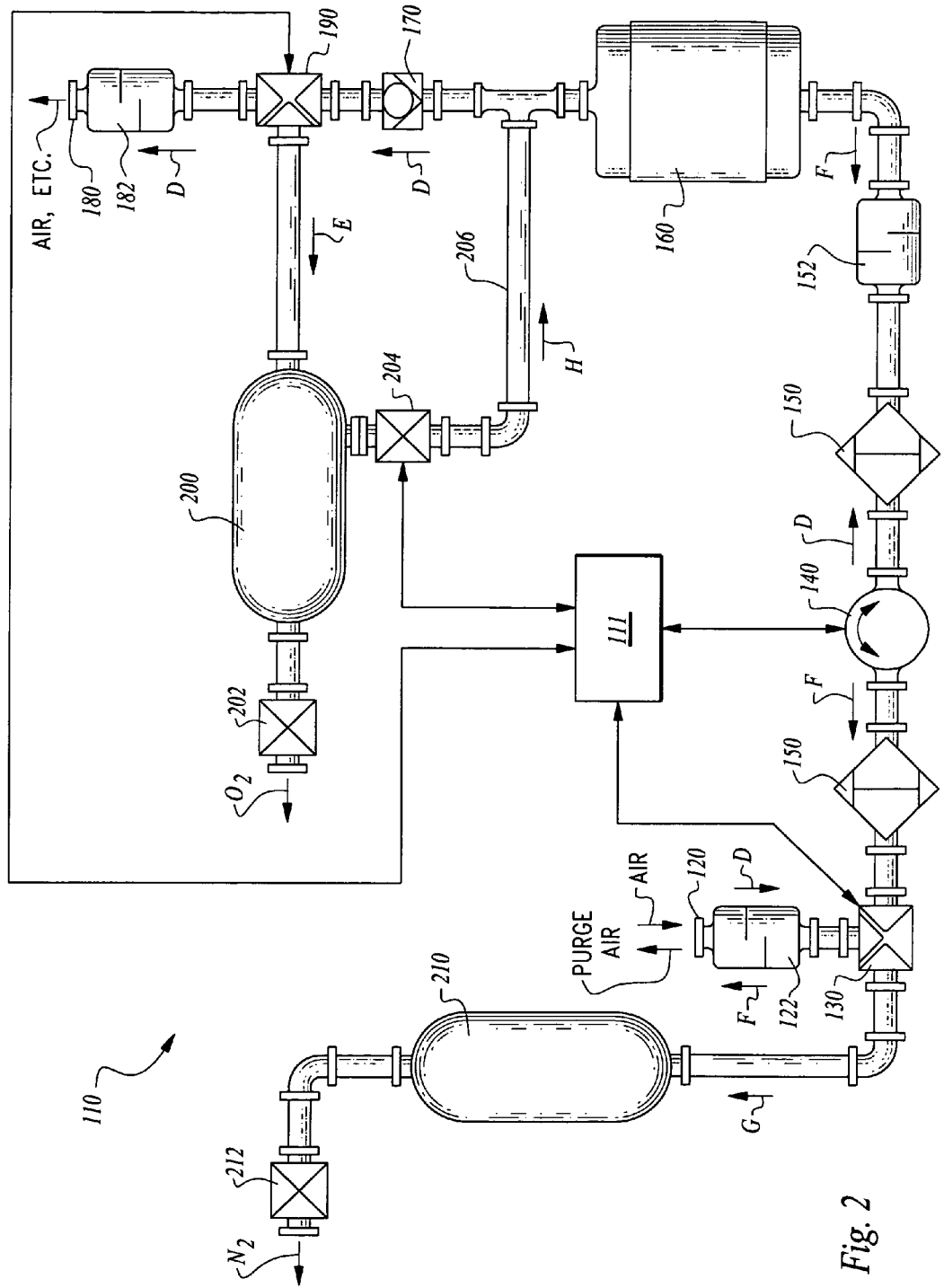
FIG. 2 is a schematic of a second embodiment system which is configured to collect two constituent gases such as nitrogen and oxygen from a gas mixture such as air.

In a second embodiment shown in FIG. 2, the nitrogen and oxygen separation system 110 is supplied with analogous elements to those of the system 10 of FIG. 1. In particular, an inlet 120 is provided upstream of a blower 140 with at least one valve (in this embodiment provided as an inlet three-way valve 130) interposed between the inlet 120 and the blower 140. Heat exchangers 150 are optionally provided on either side of the blower 140. The chamber 160 is provided on a side of the blower 140 opposite the inlet 120. A check valve 170 is provided on a side of the chamber 160 opposite the blower 140. An exhaust three-way valve 190 is located downstream of the check valve 170 which leads to both an exhaust 180 and an oxygen buffer tank 200. With this nitrogen and oxygen separation system 110, oxygen and nitrogen are simultaneously separated from each other and collected in the oxygen buffer tank 200 or the nitrogen buffer tank 210.

More specifically, and with reference to FIG. 1, particular details of the first embodiment of this invention are described, depicting a nitrogen separation system 10. While this system 10 is illustrated by an exemplary configuration where a gas mixture in the form of air is separated to allow nitrogen to be collected, other starting gas mixtures could be separated and gases other than nitrogen could be target constituents to be selectively collected, by providing a separate starting gas mixture and by utilizing an appropriate adsorption media constituent within the chamber 60 for collection of the constituent gas desired. The target mixture could also be itself a mixture of more than one gas, but less than all of the gases in the air or other starting gas mixture.

In this system 10, an inlet 20 is provided adjacent a source of air to be processed. This source of air could be the ambient air surrounding the system 10 or could be some closed supply of air or some other gas mixture at a minimum containing nitrogen therein, such that the system in this illustrated embodiment can effectively separate nitrogen from that gas mixture. In FIG. 1 an inlet valve 24 is depicted adjacent the inlet 20. Such an inlet valve 24 can be provided separate from the feed valve 34 or a single three-way inlet valve can be utilized (see FIG. 2 depicting an inlet three-way valve 130) which would be located at a tee downstream of the inlet 20 and between the inlet 20 and the blower 40.

This inlet valve 24 or corresponding flow control device is preferably of a valve type which has primarily two positions including an open position and a closed position. Typically, these positions can be selected through actuation given by an electric signal, such as by the utilization of a solenoid.

A controller 100 is preferably provided to supply a driving electric signal at an appropriate time to cause the inlet valve 24 to open or close in accordance with the desired operation for the system 10. A tee 26 or other junction is preferably provided downstream of the inlet valve 24. If a three-way valve is utilized downstream of the inlet 20, this three-way valve would typically be located at the location of this tee 26 or other junction so that the tee 26 or other junction would be combined within such a three-way valve. This tee 26 or other junction has two separate pathways with one pathway leading to the blower 40 or other gas compression element, and the other pathway leading to the buffer tank 90 or other nitrogen collection region. A feed valve 34 is preferably interposed between the tee 26 and the buffer tank 90 unless the feed valve 34 is integrated into a three-valve along with the inlet valve 24.

The coupling of the inlet 20 to valves, tees and other elements within the system 10, as well as coupling of other elements within the system 10 to each other is typically provided by tubular conduits formed of materials which are generally compatible with the gases to be handled. Sizing of these conduits is selected to match mass flow rates associated with a particular design based on the system 10 of this invention. These conduits are preferably substantially closed so that leakage into and out of the system is limited to specify inlets, exhausts and outlets particularly provided for the purpose of inputting or outputting gases from the system 10.

Figure 3:
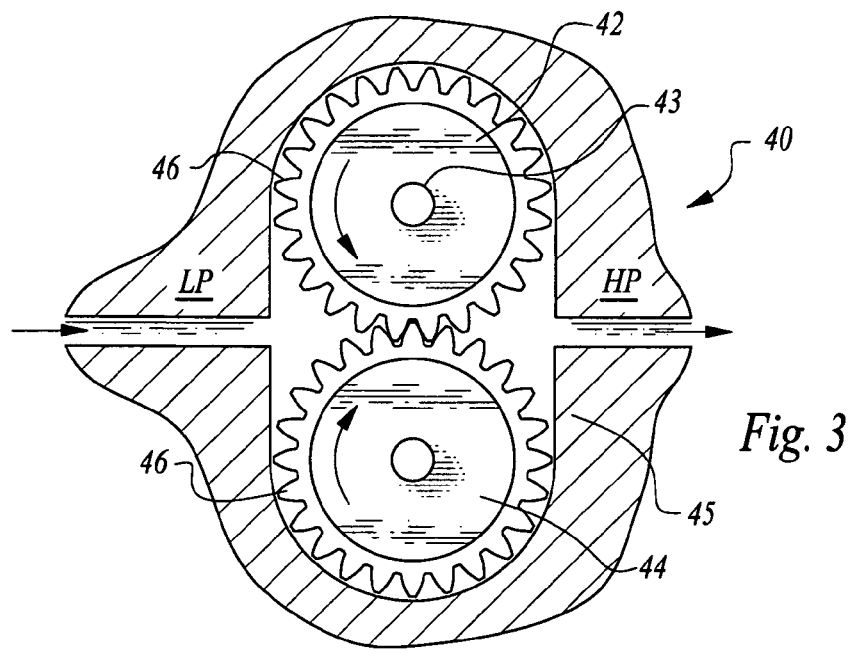
FIG. 3 is a detail of a gas compression element according to a first embodiment.

The blower 40 is coupled to the tee 26 to allow gas flow therebetween. The blower 40 is a preferred form of gas compression element. This blower 40 or other gas compression element has a low pressure side and a high pressure side and these low pressure and high pressure sides are reversible. One configuration for the blower is as a positive displacement pump with a gear style lobed impeller. As shown in FIG. 3, a drive gear 42 and follower gear 44 rotate within a housing 45 with gear teeth 46 on meshing to drive air therethrough. In a most preferred form of the invention, the blower 40 is in the form of a reversible blower. In one embodiment, the blower is driven (through drive gear 42 of FIG. 3) by a three phase motor and by swapping poles of the three phase motor the elements within the blower 40 can be caused to move in an opposite direction, reversing the high pressure and low pressure sides of the blower and causing gas to move in an opposite direction through the blower 40.

Figure 5:
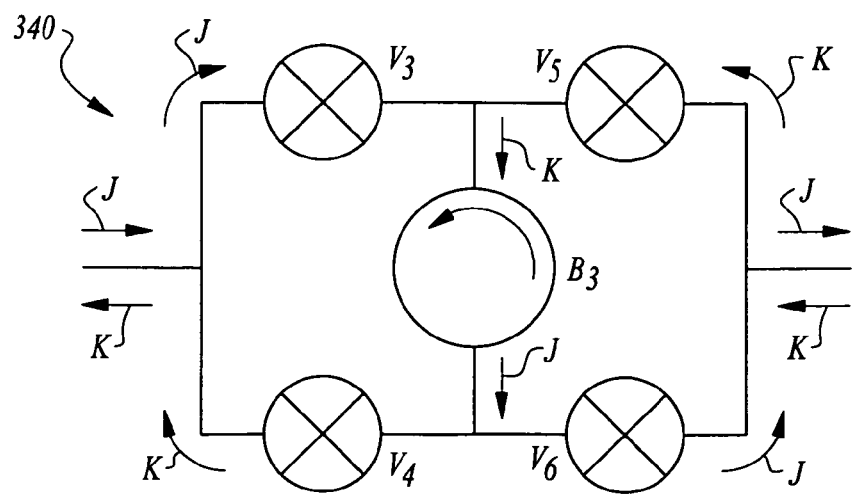
FIG. 5 is a schematic of a second alternative arrangement of the blower in the system of this invention.

Other methodologies can be followed to reverse the direction of flow and high pressure and low pressure sides of the blower 40 or other gas compression elements. For instance, the gas compression element could be configured as a compressor that always has the same high pressure and low pressure side but with piping and valves configured to selectively rearrange which side of such a compressor is located closer to the chamber 60 and which side of such a compressor $B_3$ of FIG. 5 is located closer to the inlet 20. See for instance FIG. 5 depicting blower 340 with control of valves $V_3$, $V_4$, $V_5$ and $V_6$ to either route flow along arrow J or in a reverse direction following arrow K.

Figure 4:
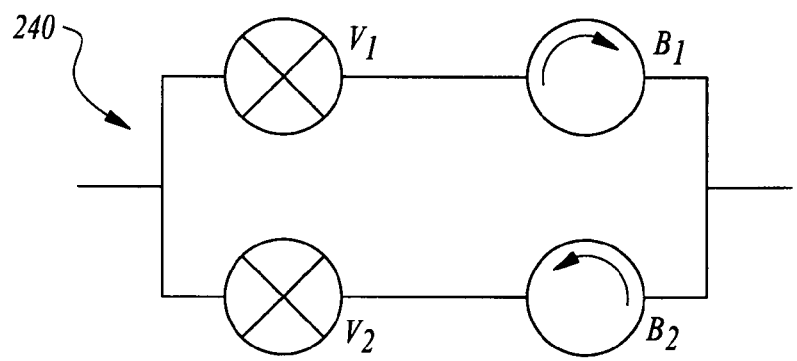
FIG. 4 is a schematic of an alternative arrangement of the blower in the system of this invention.

As another alternative, shown in FIG. 4 as blower assembly 240, multiple blowers $B_1$, $B_2$ or other gas compression elements are provided in parallel with each other and valves $V_1$, $V_2$ opened and closed to cause airflow to change from toward the chamber 60 or away from the chamber 60 relative to the blower 40 or other gas compression element. This blower 40 or other gas compression element is coupled to the controller 100 in a manner so that the controller can cause the blower 40 to reverse when desired according to a program for operation of the system 10.

An optional heat exchanger 50 is provided on a side of the blower 40 opposite the inlet 20. This heat exchanger 50 can beneficially remove heat of compression associated with the blower 40. Such a heat exchanger 50 can also be configured to at least to some extent condense moisture out of air or other gases passing through the heat exchanger 50. Most preferably, the air is dried either through operation of the heat exchanger 50 or through other means so that the chamber 60 and the media contained therein can operate most effectively to adsorb nitrogen.

The chamber 60 is located on a side of the heat exchanger 50 opposite the blower 40. This chamber 60 is a closed vessel which contains molecular sieve media or other media which selective adsorbs nitrogen (or some other target gas) over oxygen and other constituents of air (or other gases to be separated). The media is preferably provided as spherical beads, but could be material having other sizes and shapes. In a preferred form, the chamber 60 includes a lower plenum 62 adjacent the heat exchanger 50, a molecular sieve region 64 and top plenum 66 on a side of the chamber 60 opposite the bottom plenum 62. The plenums 62, 66 assist in distributing gases generally evenly as they pass into and through the chamber 60. If desired, baffles or other flow control elements can be included within the chamber 60 to maximize the effectiveness of the media contained therein, to ensure coming in contact with constituent gases to be selectively adsorbed.

The top plenum 66 is located adjacent a check valve 70 or other exhaust valve which leads to an exhaust 80. If the check valve 70 is in the form of a non-automatic controlled valve, such a valve would be coupled to the controller 100 for control in accordance with an operational program for the system 10. When configured as a check valve 70, such a check valve 70 can automatically close when pressure indicates reverse flow, or can be controlled to act similarly to an automatic pressure sensitive check valve.

Operation of the system 10 preferably occurs in the following manner. Initially, the chamber 60 is loaded with adsorption media which selectively adsorbs nitrogen over other constituents of air. The blower 40 is then activated and caused to operate in a direction driving air into the inlet 20, through the blower 40, and through the chamber 60 and out the exhaust 80 (along arrow A of FIG. 1). In this first initial stage, the inlet valve 24 is open to allow air to pass from the inlet 20 to the blower 40. This first stage of operation of the system 10 continues until the adsorption media within the chamber 60 is saturated with nitrogen. Such saturation can be detected using some form of detector, such as a nitrogen detector downstream of the chamber 60, or can be predicted or established through experimentation and correlated with a time so that the controller 100 merely tracks time for operation of stages of the system 10.

After such substantial saturation has occurred within the chamber 60. The blower 40 is caused to be reversed. With the reversing of the blower 40, pressure within the chamber 60 begins to drop and the check valve 70 is automatically caused to be closed. If the check valve 70 is instead a control valve, the controller 100 causes the valve adjacent the exhaust 80 to be closed. Pressure within the chamber 60 is thus reduced to below atmospheric pressure and the pressure lower than existed when the nitrogen was being adsorbed by media within the chamber 60. As this pressure drops, the media releases nitrogen.

Shortly before the blower 40 is reversed, preferably the valves 24, 34 are charged (or an equivalent three-way valve is charged) so that nitrogen from the nitrogen buffer tank 90 is supplied through the blower 40 to the chamber 60. This purges the line of air. Then when the blower 40 is reversed, the desorbed nitrogen and purge nitrogen return to the tank 90. In one embodiment, when the blower 40 is reversed the valve 24 is opened and the valve 34 is closed (or an equivalent three-way valve is adjusted) for a short purge period. Such a short purge period allows for removal of carbon dioxide and moisture which are typically desorbed most prevalently when the chamber 60 first experiences pressure reduction, so that carbon dioxide and moisture are most effectively minimized in the nitrogen buffer tank 90.

As an alternative to this nitrogen purge, after such reversing of the blower 40, the inlet valve 24 can remain open and the feed valve 34 can remain closed, so that gas travels along arrow B from the chamber 60, through the blower 40 and out the inlet 20. Such reversal of flow out of the inlet 20 occurs to purge air as well as carbon dioxide and moisture within lines between the chamber 60 and the inlet 20 out of the system.

Once such purge is complete (either through use of detection equipment or by measurement of a predicted amount of time required for such purging of air, carbon dioxide and moisture) the blower 40 continues to operate in the reverse direction, but the inlet valve 24 is closed and the feed valve 34 is opened. Flow thus continues along arrow C to the buffer tank 90 of the nitrogen collection region of the system 10 by action of the blower 40 during a production phase. The nitrogen buffer tank 90 continues to collect nitrogen until the chamber 60 has had a desired proportion of nitrogen desorbed from the adsorption media therein. Preferably and to maximize removal of nitrogen from the chamber 60 and direction of the nitrogen to the nitrogen buffer tank 90, the valve adjacent the exhaust 80 can be caused to be opened briefly while the blower 40 continues to operate in the reverse direction and to allow oxygen, or other gases adjacent the exhaust 80 to flow back into the chamber 60 and purge nitrogen out of the chamber 60 and toward the nitrogen buffer tank 90.

Once such purge of the chamber 60 has been completed, such a check valve 70 adjacent the exhaust 80 can remain open and the blower 40 is reversed back to its original flow direction. Air again is drawn into the inlet 20 and the inlet valve 24 is reopened with the feed valve 34 reclosed, so that flow occurs from the inlet 20 through the blower 40 and on to the chamber 60 and through to the exhaust 80 to repeat the process. The system 10 can thus continue as long as a supply of nitrogen is desired.

The buffer tank 90 allows for a relatively steady supply even though the system 10 is only producing nitrogen to the nitrogen supply in a periodic manner. If a continuous supply of nitrogen is desired, two or more systems 10 can be provided in parallel each coupled to a common nitrogen supply which could then be a substantially continuous supply. A supply valve/outlet 92 is preferably provided downstream of the buffer tank 90. Such a valve can be a pressure regulated valve or other throttleable valve to release nitrogen only when required and at a flow rate and/or pressure desired for downstream equipment which utilizes nitrogen. While nitrogen and air are primarily referred to in this embodiment, other gases can be separated from gas mixtures with appropriate adjustment of the adsorbent material within the chamber 60.

With particular reference to FIG. 2, details of a second embodiment of this invention are described where both nitrogen and oxygen are simultaneously separated from air (or other multiple constituents of a gas mixture are simultaneously collected). In this nitrogen and oxygen separation system 110, many portions of the system 110 are analogous to the system 10 described in detail above, with distinct details of the system 110 emphasized herein. In this embodiment an inlet 120 is illustrated as an inlet three-way valve 130 which simultaneously performs the functions of both the inlet valve 24 and feed valve 34 of the embodiment of FIG. 1 and also includes the junction therein rather than between two separate valves as shown in FIG. 1. A silencer 122 is also shown adjacent the inlet 120 for noise reduction. Multiple heat exchangers 150 and a silencer 152 are located along a line also including the blower 140 between the inlet 120 and chamber 160. A check valve 170 is provided on a side of the chamber 160 opposite the blower 140. A controller 111 controls the direction of operation of the blower 140 as well as control of the valves 130, 190 and 204. A similar nitrogen buffer tank 210 is also supplied.

Uniquely, rather than exhausting oxygen, as in the first embodiment of FIG. 1 described above, in this embodiment of FIG. 2 an exhaust through a valve 190 is supplied downstream of the check valve 170 which feeds both an exhaust 180 and an oxygen buffer tank 200 or other second constituent gas collection region. The oxygen buffer tank 200 also feeds a supply valve 202 for removal of oxygen from the system 110, as well as a purge valve 204 and purge line 206 leading back to the chamber 160 and bypassing the check valve 170.

Operation of the system 110 of FIG. 2 occurs as follows. Initially, the inlet three-way valve 130 is configured to allow flow from the inlet 120 to the blower 140. The blower 140 is configured to draw air into the inlet 120 and toward the blower 140, and on to the chamber 160. The exhaust three-way valve 190 is configured to direct gases leaving the chamber 160 to the exhaust 180 or other outlet. Thus, air initially flows along arrow D to the chamber 160 and non-nitrogen constituents of the air continue along arrow D out the exhaust 180. A silencer 182 is optionally provided adjacent the exhaust 180 for noise reduction.

Such a configuration including discharge through the exhaust 180 continues until non-oxygen gaseous components have been purged from portions of the system 110 on a side of the chamber 160 opposite the blower 140. The exhaust three-way valve 190 can then be transitioned to cause oxygen being discharged from the chamber 160 to be diverted to the oxygen buffer tank 200 or other oxygen collection region. Oxygen is thus collected within the oxygen buffer tank 200 as nitrogen is being simultaneously adsorbed within the chamber 160. Argon is also typically collected within the oxygen buffer tank 200, but only in relatively small quantities. As desired, oxygen can be discharged from the oxygen supply along a supply valve 202. Arrow E depicts this phase where oxygen is diverted from the exhaust three-way valve 190 to the oxygen buffer tank 200.

Next, the controller 111 causes the blower 140 to reverse direction so that flow occurs along arrow F from the chamber 160 through the blower 140 to the inlet three-way valve 130. This reverse of flow causes the check valve 170 to close and for a vacuum to be drawn on the chamber 160. As with the embodiment of FIG. 1, before such flow reversal the valve 130 is adjusted to allow nitrogen from the nitrogen tank 210 to purge the lines. After flow reversal the valve 130 is preferably transitioned twice so that purge of carbon dioxide and moisture can occur out of the inlet 120. Alternatively, purge air from an inlet 120 side of the chamber 160 is purged out of the inlet 120 by leaving the inlet three-way valve 130 initially in its original configuration so that discharge of air between the chamber 160 and inlet 120 is purged along arrow F.

After such purge is complete, the inlet three-way valve 130 is transitioned to allow flow to occur from the chamber 160 through the blower 140, through the three-way valve 130 to the nitrogen buffer tank 210 along arrow G. Once a desired amount of nitrogen has been desorbed from media within the chamber 160 (typically a maximum available amount), the purge valve 204 can be optionally open so that oxygen can leave the oxygen buffer tank 200 and bypass the check valve 170 to go back to the chamber 160 and purge nitrogen from the chamber 160 and drive this nitrogen to the nitrogen buffer tank 210. After such purge, the purge valve 204 is closed and the blower 140 can then be re-reversed to its original configuration driving air into the inlet 120, through the blower 140 and into the chamber 160 to repeat the process.

With buffer tanks preferably provided for the oxygen 200 and the nitrogen 210, nitrogen and oxygen can be supplied on demand from the system 110. If a continuous supply of nitrogen and oxygen is desired or if it is desirable to minimize or eliminate the tanks 200, 210, multiple systems 110 can be operated in parallel leaving a common nitrogen supply subassembly and/or oxygen supply subassembly. The valves 202, 212 can be throttleable valves which are opened and closed to an amount required to supply the desired amount of nitrogen and/or oxygen from the system 110.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. A system for separation of a gas mixture and collection of at least one constituent gas, comprising in combination:
    a gas mixture inlet adapted to insert the gas mixture into said system;
    a gas compression element coupled to said inlet, said gas compression element having a high pressure side and a low pressure side, said sides of said gas compression element being reversible;
    an inlet valve between said inlet and said gas compression element, said inlet valve adapted to open and close access between said inlet and said gas compression element;
    a chamber on a side of said gas compression element opposite said inlet;
    said chamber including media therein which preferentially adsorb a target constituent gas more than other gases in the gas mixture;
    an exhaust valve on a side of said chamber opposite said inlet;
    a collection region; and
    a junction on a side of said gas compression element opposite said chamber, said junction adapted to at least partially divert gas from said chamber through said gas compression element to said collection region.

2. The system of claim 1 wherein said inlet valve is a three-way valve adapted to permit flow selectively between either said inlet and said gas compression element or between said collection region and said gas compression element through said junction.

3. The system of claim 1 wherein a feed valve is provided separate from said inlet valve, said feed valve adapted to be open when said inlet valve is shut and said inlet valve adapted to be open when said feed valve is shut, said feed valve located between said gas compression element and said collection region.

4. The system of claim 1 wherein said gas compression element includes a reversible blower, said reversible blower including multiple lobes said lobes configured to rotate to advance gas through said blower in a substantially positive displacement manner selectively in two opposite directions.

5. The system of claim 1 wherein said gas compression element includes a compressor having a high pressure side and a low pressure side and with valves adjacent said high pressure side and said low pressure side which facilitate reversing of portions of said system adjacent said compressor relative to said high pressure side and said low pressure side of said compressor.

6. The system of claim 1 wherein a second gas compression element is provided in parallel with said gas compression element, said two gas compression elements configured so that high pressure and low pressure sides thereof are oriented opposite each other and with valves selectively coupling one of said two gas compression elements to adjacent portions of said system.

7. The system of claim 1 wherein a controller is coupled to said inlet valve, said exhaust valve and said gas compression element, said controller adapted to reverse said gas compression element and to purge air out of said inlet after said gas compression element is caused to reverse, and before adjusting said inlet valve to divert gas from said gas compression element to said collection region.

8. The system of claim 7 wherein said exhaust valve is coupled to said controller, said controller adapted to cause said exhaust valve to close when said gas compression element reverses, to draw a vacuum on said chamber, and said controller adapted to open said exhaust valve before said gas compression element returns to supplying gas to said chamber, such that a purge of the target constituent from said chamber and past said gas compression element occurs before said gas compression element reverses to again supply the gas mixture to said chamber.

9. The system of claim 1 wherein said exhaust valve is a check valve oriented to be open when said gas compression element has said high pressure side on a side of said gas compression element closest to said chamber and be open when said low pressure side of said gas compression element is located closest to said chamber.

10. The system of claim 1 wherein said collection region includes a buffer tank.

11. The system of claim 1 wherein a second constituent gas collection region is located on a side of said chamber opposite said gas compression element, said exhaust valve configured to be selectively coupleable to either said second collection region or an exhaust from said system.

12. The system of claim 11 wherein a check valve is interposed between said chamber and said exhaust valve.

13. The system of claim 12 wherein a purge line is located between said second collection region and said chamber and spaced from said check valve, said purge line including a purge valve which is selectively openable to allow the second constituent gas to flow from said second collection region to said chamber.

14. The system of claim 11 wherein a controller is coupled to said inlet valve, said exhaust valve and said gas compression element, said controller programmed to adjust said exhaust valve to open said chamber to said exhaust during an initial stage and to open said chamber to said second collection region during a production phase following said initial phase.

15. The system of claim 14 wherein said controller is adapted to open a purge valve along a purge line between said second collection region and said chamber for a purge time before said gas compression element is reversed from feeding gas away from said chamber to feeding gas toward said chamber.

* * * * *